UNITED STATES PATENT OFFICE.

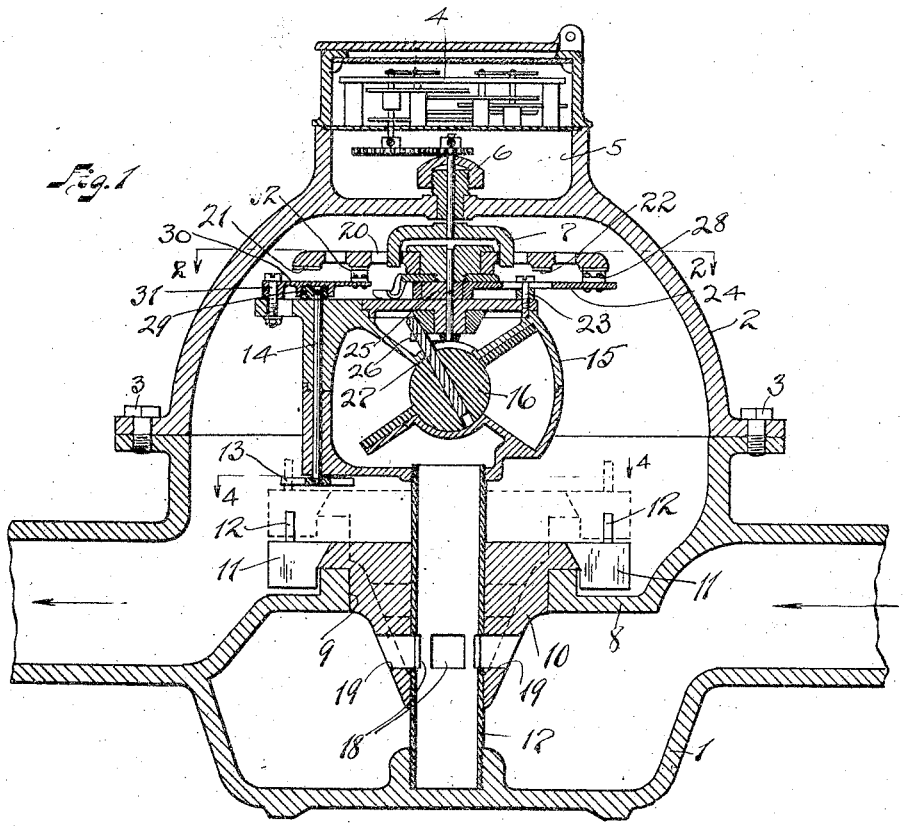
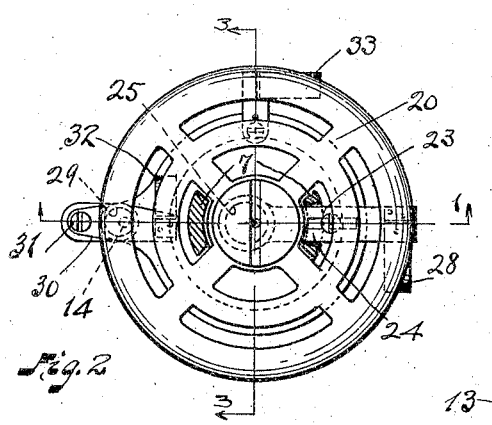
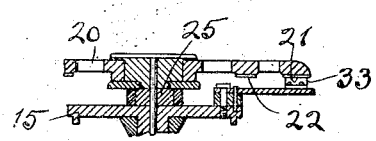
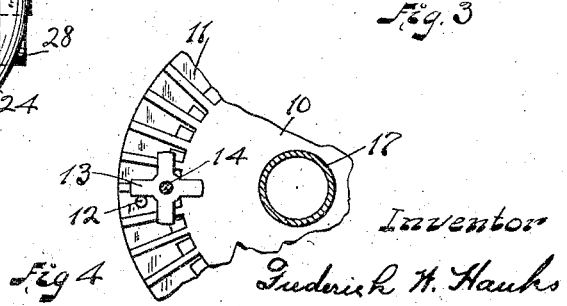

FREDERICK W. HANKS, OF CLEVELAND, OHIO.

WATER-METER.

1,172,452.  Specification of Letters Patent.  Patented Feb. 22, 1916.

Application filed April 12, 1913. Serial No. 760,725.

*To all whom it may concern:*

Be it known that I, FREDERICK W. HANKS, a citizen of the United States, and a resident of Cleveland, county of Cuyahoga, and State of Ohio, have invented a new and useful Improvement in Water-Meters, of which the following is a specification, the principle of the invention being herein explained and the best mode in which I have contemplated applying that principle, so as to distinguish it from other inventions.

The present improvements relate more specifically to a compound water meter, that is, a meter combining a high-duty measuring device for registering the flow of strong currents, and a low-duty measuring device for measuring the flow of smaller currents. A device suitable for the one purpose, as is well understood, is not adaptable for registering accurately when subjected to the other sort of duty, and yet in many instances the rate of flow varies between such wide limits that it is necessary to provide means for measuring both the low and high rates of flow.

The object of the present invention is to provide a compound meter which will be simple and compact in construction, and which will automatically shift from the high-duty to low-duty measuring device, and vice versa, without attention being required from without.

Another object is to so arrange the high and low duty devices that a single register need by employed in connection therewith, thus reducing the expense of construction and at the same time simplifying the reading of the meter.

To the accomplishment of these and related ends, the invention, then, consists of the means hereinafter fully described and particularly pointed out in the claims.

The annexed drawing and the following description set forth in detail certain mechanism embodying the invention, such disclosed means constituting, however, but one of various mechanical forms in which the principle of the invention may be used.

In said annexed drawing:—Figure 1 is a central vertical section of a compound meter embodying my present improvements; Fig. 2 is a plan view of a portion of such meter taken on a horizontal section indicated by the line 2—2, Fig. 1; Fig. 3 is a vertical section of a detail at right angles to the plane of Fig. 1, as indicated by the line 3—3, Fig. 2; and Fig. 4 is a broken plan and sectional view of a detail taken on the plane indicated by the line 4—4, Fig. 1.

The general form, as well as the dimensions of the main casing of the meter may vary within considerable limits, depending upon the particular use to which the meter is to be put. Preferably, however, such casing is separable in a horizontal plane, the upper portion 2 being removable from the lower portion 1 upon loosening set bolts 3. Such upper portion carries the registering mechanism 4, which is of typical construction and need not be described in detail. A separate chamber 5 is provided in such upper casing portion to receive this register, the latter being driven through a spindle 6 that is provided at its lower end with a clutch 7 adapted to engage with mechanism presently to be described and having operative connection with both of the measuring devices, proper. Accordingly, whichever one of the latter is being operated by the flow of water through the meter, the amount of such flow will be noted on the single register.

The main chamber in the meter casing is divided into an upper and a lower portion by a transverse wall or partition 8 provided centrally with an opening 9 forming a valve seat. The valve 10, which is adapted to register with this seat and be normally held thereon by its own weight, is of the form clearly appearing in Fig. 1. As further shown in Fig. 4, the periphery of said valve is provided with vanes 11 whereby, when the valve is raised from its seat by the pressure of the water below the partition 8 and such water thus permitted to escape through the opening in said partition, a rotative movement will be imparted to said valve.

The upper raised position of the valve is indicated in dotted outline in Fig. 1. From the same figure it will be observed that in this position of the valve, pins 12 (one or more in number) on its upper surface are adapted to engage and rotate a star-wheel 13 on the lower end of a vertically disposed spindle 14 carried in the walls of an interior casing 15, which houses a familiar low-duty meter 16 of the nutating piston type. Communication with the interior of this low-duty meter whereby water may be supplied thereto, is had through a stationary centrally disposed tube 17, passing through the aforesaid valve 10. This tube is provided at a point below the partition 8 with a series of openings 18, and the valve 10 is formed with openings 19 adapted to register therewith in said valve's lower position, shown in full lines in Fig. 1. Accordingly, as long as the flow of water through the meter is small, such flow will be through these openings 18 and 19 and into the interior of the supplementary casing 15, which houses the low-duty meter, such water thence escaping into the upper portion of the main casing. Upon the valve being raised, however, into the position indicated in dotted outline, not only is a flow of water directly through the partition 8 permitted, but the flow through this central pipe and low-duty meter is cut off by the tapering body of valve 10.

For communicating to the register 4 the motion imparted to the spindle 14 by the main valve 10, or the nutating piston of the low-duty meter, the following means are provided:—An annular member or spider 20 formed on its under face with two annular concentric series of notches 21 and 22, is rotatably mounted on the upper face of the supplementary casing 15, that houses said low-duty meter. Similarly mounted on said casing about a pin 23 is an oscillatory lever-arm 24, the inner end of which engages an eccentric on a composite spindle 25 centrally mounted on the casing and provided at its lower end with an arm 26 for engagement with the pin 27 on the piston of the meter. The rotation of the latter, accordingly, serves to oscillate the arm 24 about its own pivotal axis, and thus impart a step by step movement to the annular spider, by reason of a pawl 28 carried by the outer end of said arm and engaging the series of notches 21 on said spindle. The spindle 14, that is adapted to be actuated by the valve 10 when in raised position, carries an eccentric 29 at its upper end which is adapted to oscillate a second lever-arm 30 pivotal about a pin 31, in much the same fashion as said first-named lever arm. This latter arm engages the second series of notches or teeth 22 through a similar pawl 32. Both the foregoing pawls are conveniently formed of recurved springs, and in addition thereto a third pawl 33, fixedly attached to the casing 15, (see Figs. 2 and 3), is adapted to engage one of the series of notches, in order to retain the spider against rotation except in a forward direction, when actuated by one or the other of the actuating pawls 28 or 32.

In operation, the direction of flow of water or other fluid through the meter will be that indicated by the arrows in the inlet and outlet openings respectively. Normally the position of parts will be that shown in Fig. 1 in full lines, all the fluid passing through the tube 17 to the low-duty measuring device. When, however, the flow tends to increase by reason of a greater disparity of pressures on the two sides of the partition 8, such increased flow will lift the valve 10 from its seat and at the same time by reacting with the vanes around the periphery of said valve, such flow of fluid will impart rotary motion to the valve. The lifting of the valve in the fashion just described shuts off the connection with the tube 17 and renders the low-duty device inoperative for the time being. While the register is not actuated accordingly by the low-duty device under the conditions just described, the rotating valve, which serves as a high-duty measuring device will engage the star-wheel 13 and thus cause the register to keep account of the more rapid flow of water through the valve opening.

The form of the valve 10, it should be observed, is such that the opening in the partition is only actually opened after said valve has been raised high enough to close the openings 18 in the tube 17. Thus the low-duty meter is shut off before the high-duty device, specifically the rotatable valve, or vaned wheel, is brought into play.

The foregoing construction, it will be observed, provides an extremely simple and compact meter, by combining in one member the rotating wheel and valve which have heretofore been made separate elements in the structure. Moreover, by arranging for the communication of the motion of such nutating piston of the low-duty device to the same register, the expense of providing two separate registers is avoided and the summation of the flows through the two meters is always available to be read without any calculation being necessary.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. In mechanism of the character described, the combination of a register; a low-duty measuring device; a high-duty measuring device; means adapted alternatively to connect said devices with the supply to be measured; and means adapted to operatively connect said devices with said register.

2. In mechanism of the character described, the combination of a register; a low-duty measuring device; and a high-duty measuring device; means adapted alternatively to connect said devices with the supply to be measured, said means being automatically controlled by variations in such supply; and means adapted to operatively connect said devices with said register.

3. In mechanism of the character described, the combination of a low-duty measuring device; a connection for supplying the fluid to be measured to said device; and a high-duty measuring device, said high-duty device being adapted to control said connection to the low-duty device.

4. In mechanism of the character described, the combination of a low-duty measuring device; a connection for supplying the fluid to be measured to said device; and a high-duty measuring device, said high-duty device being normally inoperative and adapted when operative to shut off said connection to the low-duty device.

5. In mechanism of the character described, the combination of a register; a low-duty measuring device; a connection for supplying the fluid to be measured to said low-duty device; and a high-duty measuring device, said high-duty device being adapted to control said connection to the low-duty device; and independent means for operatively connecting said devices with said register.

6. In mechanism of the character described, the combination of a register; a low-duty measuring device; a connection for supplying the fluid to be measured to said low-duty device; and a high-duty measuring device, said high-duty device being normally inoperative and adapted when operative to shut off said connection to the low-duty device; and independent means for operatively connecting said devices with said register.

7. In mechanism of the character described, the combination of a casing; a partition in said casing having an opening; a valve normally seated in such opening to close the same, said valve being rotatable and having vanes adapted to react with fluid flowing through such opening in the raised position of said valve and impart rotary motion to the latter; a low-duty measuring device; and a connection for supplying fluid thereto, said valve when raised being adapted to shut off such connection.

8. In mechanism of the character described, the combination of a casing; a partition in said casing having an opening; a valve normally seated in such opening to close the same, said valve being rotatable and having vanes adapted to react with fluid flowing through such opening in the raised position of said valve and impart rotary motion to the latter; a low-duty measuring device; and a tube extending through said valve, said tube being connected at its one end with said low-duty device and having an opening near its other end, and said valve being adapted to control such opening.

9. In mechanism of the character described, the combination of a casing; a partition in said casing having an opening; a valve normally seated in such opening to close the same, said valve being rotatable and having vanes adapted to react with fluid flowing through such opening in the raised position of said valve and impart rotary motion to the latter; a low-duty measuring device; and a tube extending through said valve, said valve being connected at its one end with said low-duty device and having an opening near its other end, said valve being adapted to close such opening when raised from its normal position.

10. In mechanism of the character described, the combination of a casing; a register mounted thereon; a partition in said casing having an opening; a reciprocable valve normally seated in such opening so as to close the same; a high-duty measuring device associated with said valve and adapted to be operated by flow of fluid through such opening in raised position of said valve; a low-duty measuring device; a connection for supplying fluid thereto, said valve being adapted when raised to shut off such connection; and independent means for operatively connecting said devices with said register.

Signed by me, this 10th day of April, 1913.

FREDERICK W. HANKS.

Attested by—
D. T. DAVIES,
JNO. F. OBERLIN.